Feb. 16, 1932.    G. C. CHASE    1,845,863
CALCULATING MACHINE
Filed May 29, 1930    6 Sheets-Sheet 3

INVENTOR
Geo. C. Chase.
BY E. W. Anderson Jon.
ATTORNEY

Feb. 16, 1932.　　　　G. C. CHASE　　　　1,845,863
CALCULATING MACHINE
Filed May 29, 1930　　　6 Sheets-Sheet 4

INVENTOR
Geo. C. Chase
BY　C. W. Anderson Jr.
ATTORNEY

Feb. 16, 1932.  G. C. CHASE  1,845,863
CALCULATING MACHINE
Filed May 29, 1930  6 Sheets-Sheet 5
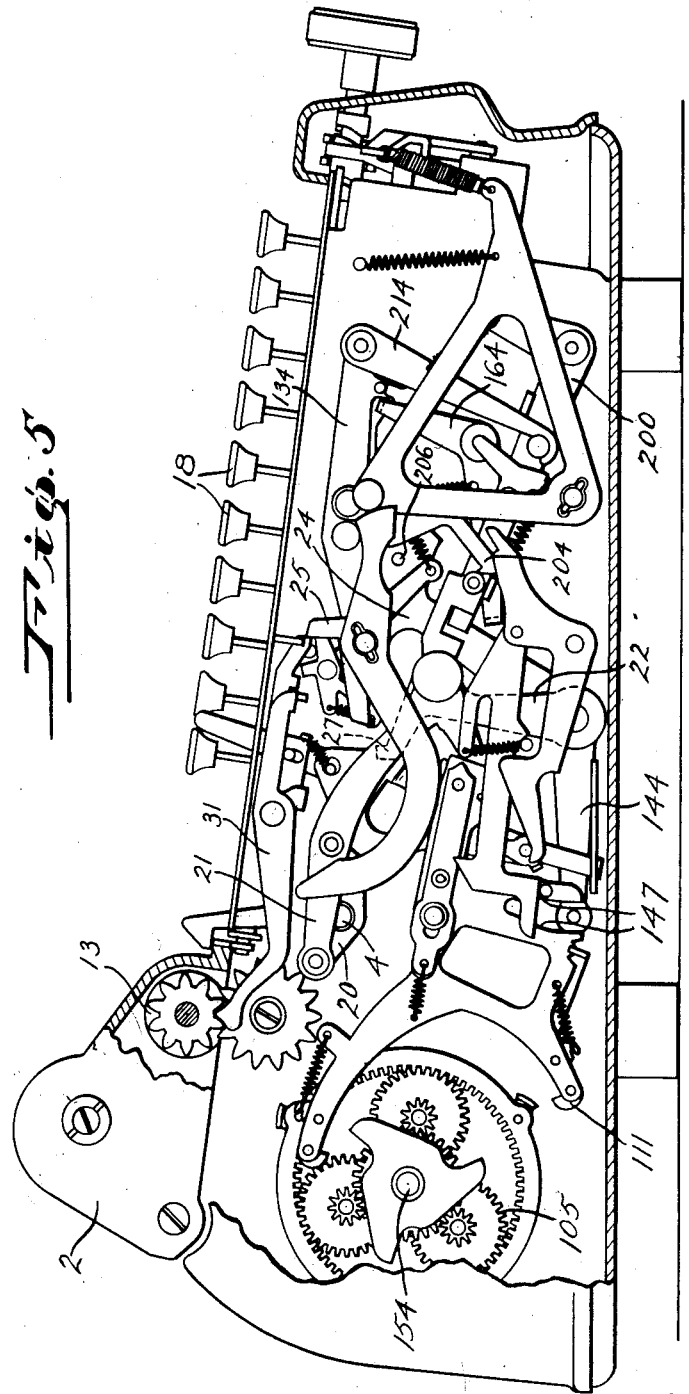
INVENTOR
Geo. C. Chase
BY  E. W. Anderson Jon.
ATTORNEY Feb. 16, 1932.    G. C. CHASE    1,845,863
CALCULATING MACHINE
Filed May 29, 1930    6 Sheets-Sheet 6
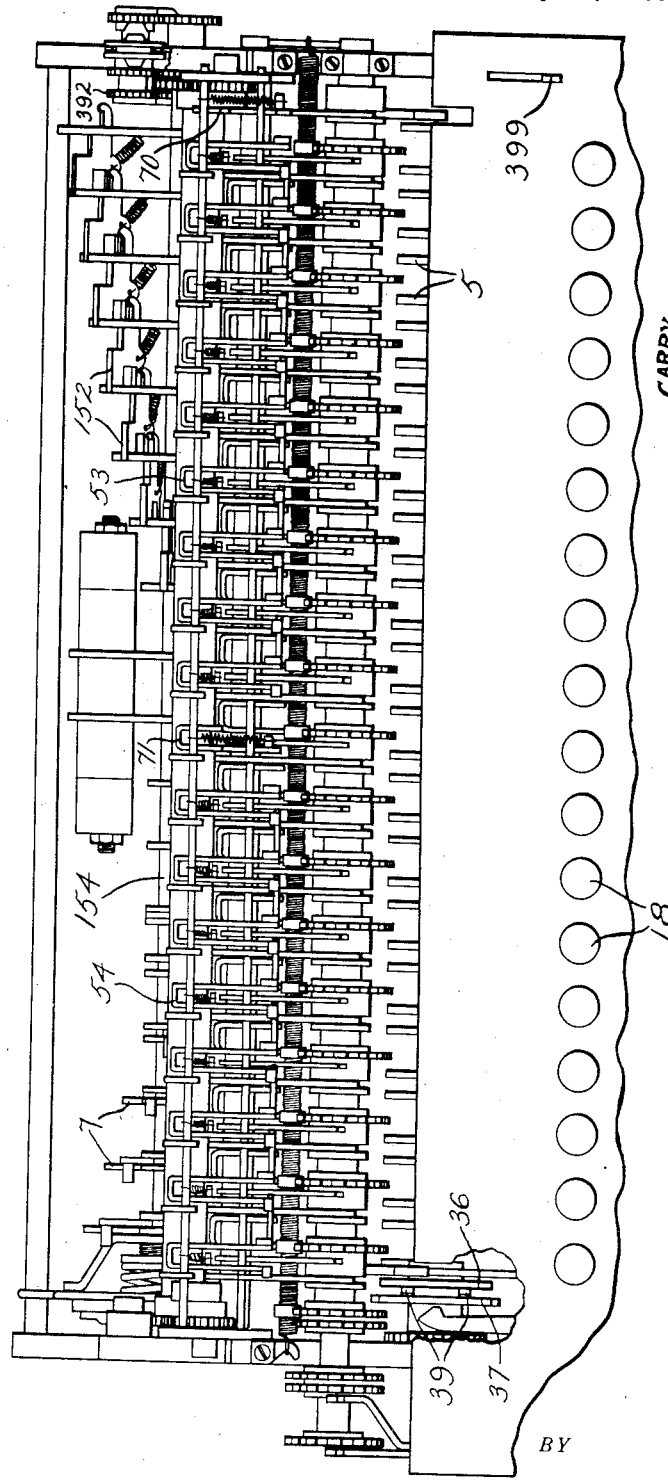
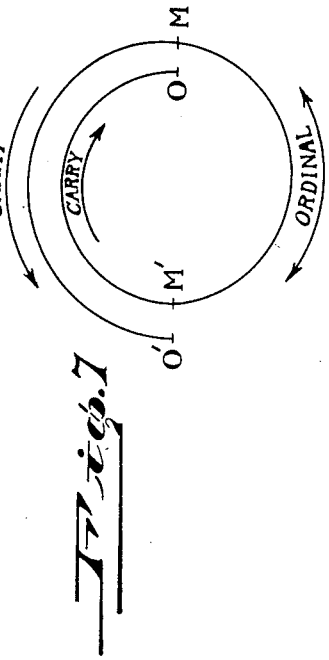
INVENTOR
Geo. C. Chase
E. W. Anderson Jon.
ATTORNEY Patented Feb. 16, 1932

1,845,863

UNITED STATES PATENT OFFICE

GEORGE C. CHASE, OF SOUTH ORANGE, NEW JERSEY, ASSIGNOR TO MONROE CALCULATING MACHINE COMPANY, OF ORANGE, NEW JERSEY, A CORPORATION OF DELAWARE

CALCULATING MACHINE

Application filed May 29, 1930. Serial No. 457,243.

The invention relates to calculating machines, and it consists in the novel construction and combinations of parts, as set forth in the appended claims.

United States Patent Number 1,566,650, issued to George C. Chase on December 22, 1925, gives an elaborate classification of calculating machines in accordance with the character of the cycles of operation employed therein. In this classification reversible cycle machines are described as those which employ a cycle of not less than three phases, a phase of ordinal registration in mid-cycle and a phase of tens carrying registration upon each side of the ordinal registration phase, the tens carrying phase which follows the ordinal registration alone being effective to register. The succession of the phases of the cycle may be reversed, so that the carry phase effective in positive registration, for instance, which follows the ordinal registration phase during additive registrations, will precede the latter phase in negative or subtractive calculations.

In determining the relation of the present invention to the above-noted classification, the changing cyclic movements, under different conditions of operation, are somewhat confusing. It will be noted, for instance, that a first cycle of operation includes an initial passive phase, while an immediately succeeding cycle is active throughout its phases.

That the machine is of the same type as that disclosed in Patent Number 1,566,650, cannot be doubted, and, if the effect upon the cycle of a reversal of operation is considered, it will be apparent that the law of operation is the same. That is to say, reversibility of the operative cycle of a machine is provided as a means of securing reversal of the registration, so that if the cycle differs under different conditions of operation, the characteristic cycle of the machine should be judged by an action which involves reversal of registration. At that time, the phase of the cycle which is passive as to registration has a function, while in continuous one-way operation, it has no function.

As will be pointed out, the passive phase upon reversal is present in the machine disclosed herein, and the object of the invention might be stated to be elimination of the passive registration phase of a motor driven reversible cycle machine at the times when such phase is without utility.

In the appended diagram, Fig. 7 of the drawings, o represents the final additive registering position of a given point on the periphery of the actuators, and o' the final subtractive registering position. Thus, a subtractive cycle will terminate at point o' and if an additive operation immediately follows, the first movement will be from o' to M, the subtractive carry members moving passively through registering position. This is the initial passive phase of the cycle. From M to M' the ordinal or differential value registration occurs, this being the ordinal registering phase, and form M' to O (the active carry phase) the additive carry occurs. Thus, it will be seen that upon reversal there is an ordinal registration phase in mid-cycle, preceded by a passive and followed by an active carry phase.

If the operation is again reversed, the carry phase from O to M' (active in additive operations) becomes the initial passive phase of the cycle, and the carry phase from M to O' will be active.

This method of operation has been employed previously in hand-operated machines, as illustrated in the Baldwin Patents Number 706,375, and Reissue Number 13,841, but the problems involved in providing motor operation for such a machine, having two distinct final registering positions of the actuators, were so baffling that no such machine has ever before been motorized.

The advantages of the arrangement, however, are much more pronounced when it is combined with motor drive means, since the greater arc allowed for the carry members permits a less rapid succession of carrying impulses for a given machine capacity, which, in high speed operation is of great advantage, and also allows a reduction of the radial length of the carry arms, with a consequent reduction of mass and inertia. Another advantage of the arrangement is that the capacity of the machine may be greatly increased, since, if the minimum practical spacing of the carry members is maintained, there will be room for the addition of a number of ordinal places in the carry and consequently in the keyboard.

In the accompanying drawings, illustrating the invention:

Fig. 5 is a left-hand elevation of the machine, with the casing and motor connection broken away;

Fig. 6 is a detail plan view of the rear portion of the machine, with the carriage removed.

Fig. 7 is a diagram of the operative cycle of the machine.

Figure 1:
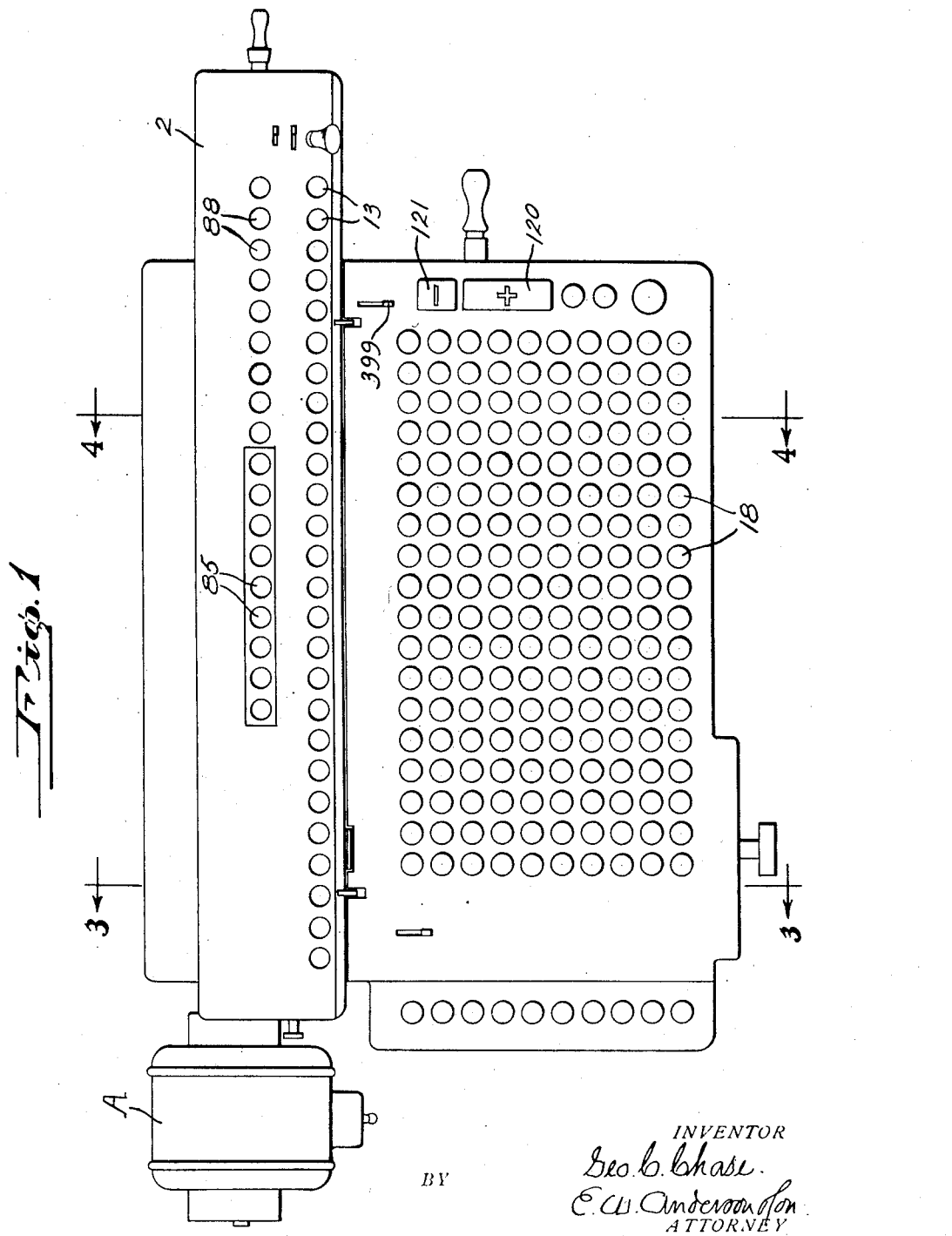
Figure 1 is a plan view of a calculating machine to which the invention has been applied and wherein eighteen banks of keys have been accommodated.
Figure 2:
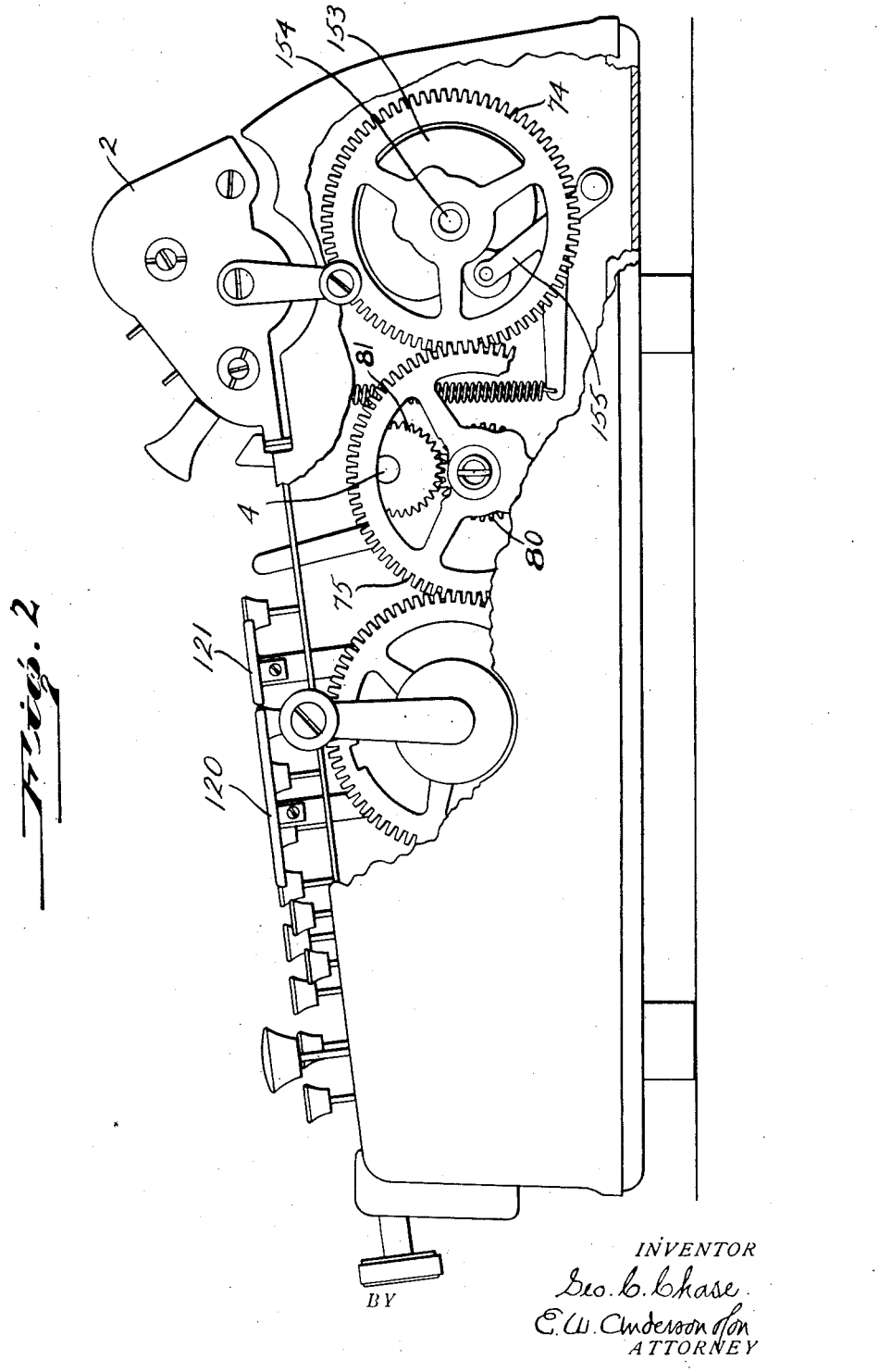
Fig. 2 is a right-hand elevation of the same, with the casing broken away.
Figure 3:
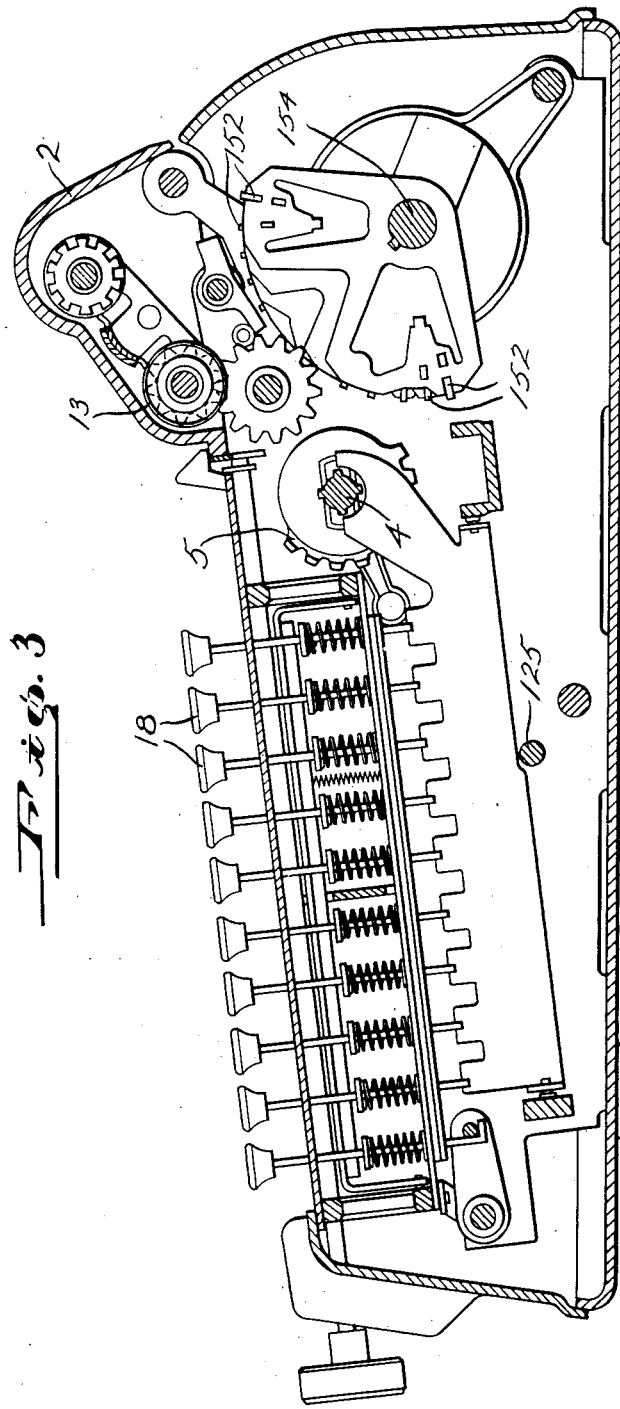
Fig. 3 is a section, taken on line 3—3 of Fig. 1.

According to the disclosure of Patent Number 1,566,650, hereinbefore referred to, amounts set up on the keyboard 18, and thereby in the differential actuator gears 5, are transferred to and totalized in the numeral wheels 13 upon rotation of the main actuator shaft 4 and the carry shaft 154, connected by gearing 74, 75, 80, 81, and driven by motor A.

Forward or reverse rotation of shafts 4 and 154, to effect additive or subtractive registration on wheels 13, is effected by a clutching and reversing transmission mechanism 105 of the planetary gear type, controlled from plus and minus bars 120 and 121, through the medium of rocker 128, mounted on shaft 125, and reversing clutch lever 111.

The means (Figs. 4 and 5) whereby the actuators are brought to rest, at the end of an operation, in proper position to begin a new rotation in either direction (that is to say, in a position equidistant from the final additive and subtractive registering positions) is also of the type disclosed in Patent 1,566,650, with modifications which will be described later.

During the operation of the machine an arm 22 is oscillated by means of a link connection 21 with a crank arm 20 of the main actuator shaft 4. Upon release of the depressed plus or minus bar, or upon transitional movement of the wheels 13 from positive to negative registration or vice versa, a trigger 31 will act to trip a normally restrained element 25, pivoted upon a stop arm 24, and said element will fall into the path of movement of a shoulder 27 of oscillatory arm 22.

As connection 20, 21 moves away from dead-center position in either direction, arm 22 will carry arm 24 forwardly therewith, against the tension of spring 28, until arm 24 encounters a fixed stop 29, a rearward extension 144 of the latter arm engaging a cam face 147 of reversing clutch lever 111 during this movement, to release the clutch. The actuators having been thus released from the drive and checked, are returned to normal position (with connection 20, 21 on dead center) by spring 28, assisted by the action of a locator cam 153, fast to shaft 154, and a spring follower 155. Positive locating means, such as that disclosed in United States Patent 1,664,661, issued to George C. Chase on April 3, 1928, are also employed, such means comprising a lever 200, normally engaging the end of link 21 to hold the connection 20, 21 in dead-center position.

When (as herein illustrated) the machine includes automatic carriage shifting mechanism, in connection, for instance, with means for performing division automatically, the movement of arm 24 may be utilized to transmit the shifting impulse, this arrangement having long been in use in the Monroe calculating machine.

When the plus or minus bar is depressed, rocker 128, through lever 134 and link 214, will lift lever 200 and engage it with a spring latch 204. As arm 24 is carried forward, in stopping the machine, a pin 206 on said arm will trip latch 204, and lever 200 will fall upon link 21 and, as the actuators are returned by spring 28, will drop into engagement with the end of the link, preventing effective movement of the actuators.

In order to prevent premature stopping of the machine when the plus or minus bar is operated by a quick manual stroke, which might operate trigger 31 before the shoulder 27 of arm 22 has swung under the free end of element 25, the quick stroke latch 164, described in Patent 1,566,650, is employed.

According to the present invention, the portion of the operative cycle available for a tens carry operation, in a given direction of rotation of the actuators, is increased by extending the active carry phase of the cycle into, or merging it with the idle carry phase, in which latter phase the reversely arranged carry teeth 152 are moved idly through their operating point.

As shown, this idle phase constitutes approximately a quarter of the cycle, of which about one-half has been utilized for active carry operations, leaving the other half in which the inertia of the rotating parts is overcome, the carriage shifting, etc.

In the embodiment of the invention herein disclosed, this is accomplished by providing two series of carry teeth 152 on the right-hand end of shaft 154, the teeth of each series being arranged in a spiral about the shaft, these two spirals intersecting toward the left-hand end of the shaft, from which point a single series of teeth is angularly adjustable to provide for continuation of either spiral. This arrangement provides for the successive carrying of tens in either direction of rotation of the actuators, being designed in accordance with the disclosure of Reissue Patent 13,841, hereinbefore referred to. Alternatively the structure of the Baldwin Patent 706,375, or of the Phinney Patent Number 1,354,841, or obvious modifications thereof, might be used.

It will be apparent, with the above described arrangement of carry members, that the final registering position of the actuators will vary according to whether additive or subtractive operations are being performed and that the proper position of rest of the actuators will be a median position, between these final registering positions. Therefore, the machine must be allowed to overrun the median position before the drive is interrupted, the numeral wheel carriage unlocked and shifted, etc., and the actuators must be restored to and finally located in the median position.

The stop element 25 may be tripped by release of the bar 120 or 121 at various points in the operative cycle, and by the numeral wheels upon action of one of the higher order carry members, that is, by a carry member at or near the left-hand end of the series. However, the timing of the movement of stop arm 24, to release the clutch, etc., is governed by the relative positions of element 25 and shoulder 27, and according to the present invention, these parts are so proportioned as to engage after the actuators have passed through the median position.

This modification of the stopping mechanism secures an additional advantage in that the portion of the cycle is extended, during which release of the add or subtract key will effect stopping of the machine, thus making it possible to operate the machine accurately at very high driven sped.

Stop arm 24 being engaged with oscillatory arm 22, the clutch will be disengaged, spring 28 will act to overcome the inertia of the rotating parts, and the latter will be returned to the median position by spring 28 and locator cam 153, all as above described.

The operation of the machine according to the present invention makes necessary the employment of a modified form of carriage lock, in order to prevent shifting of the numeral wheel carriage during the extended operative portion of the cycle, while allowing such shifting in an idle position of the actuators corresponding to a position taken during the operative portion. In its preferred form this mechanism is a modification of the means disclosed in Patent Number 1,384,634, issued to E. E. Phinney on July 12, 1921, and entitled Carriage lock for calculating machines.

In this modification, a compound lever 32 (Fig. 4) has one arm thereof yieldably held in engagement with a flange 33 on the forward edge of carriage 2 by a spring 34, the other arm of said lever having a lug 35 which, when the carriage is lifted, will be moved toward a notched locking disk 36, loosely mounted on the main actuator shaft 4. In the normal position of the parts the notch of disk 36 will lie opposite lug 35, so that the carriage may be freely raised and shifted. Disk 36 is maintained in this position by suitable friction means.

Figure 4:
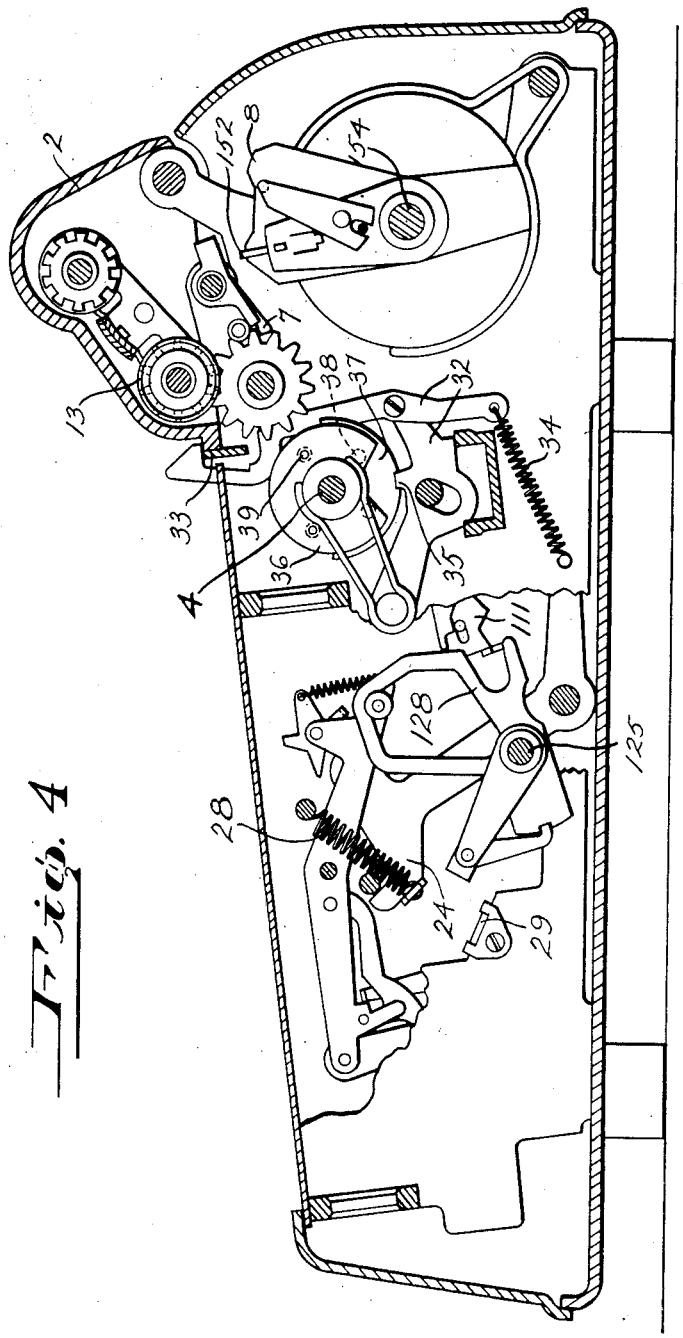
Fig. 4 is a section, taken on line 4—4 of Fig. 1.

Two lock levers 32 are shown, and each related locking disk is rotated, during the operation of the machine, by a driver fast upon shaft 4, the left-hand driver being also capable of use as a keyboard lock disk 37 (Figs. 4 and 6). One of two spaced projections 38 of disk 37, according to the direction of rotation of shaft 4, is designed to contact with one of a pair of projections 39 of disk 36 to rotate the latter.

From the arrangement of these projections it will be seen that during the first quarter or idle rotation of the actuators, disk 36 will not be moved, but that just previous to the active phase of the cycle the notch of disk 36 will be rotated out of register with lug 35, this action serving to pull the carriage down, if it is not fully in place, and preventing any further carriage movement. Owing to the lost motion between disks 37 and 36 and the restricted width of the notch in disk 36, the carriage will not be unlocked until disk 37 has made approximately a revolution and an eighth, or in other words, it will remain locked during the operative phases of the cycle.

If, now, the machine is brought to rest, disk 37 will return to normal position, leaving disk 36 also in normal. If, however, a second cycle of operation occurs, disk 36, having unlocked the carriage during the brief idle portion of the rotation, will again lock the carriage as the next active phase is started.

Disk 37, is unchanged, as to its keyboard locking function, since the ordinal actuation phase of the cycle, during which the keys 18 should be locked, has not been modified.

When the invention is utilized to provide for additional capacity in the keyboard, space becomes available in the frame of the machine to accommodate two longitudinally aligned series of carry members, 54 and 53 (Fig. 6), related to two series of revolution counting wheels 88 and 85, mounted in the carriage 2 and designed to register multipliers and quotients respectively.

Each of these series of carry members, together with the two counting fingers 71 and 70, are shown as according with the structure of the single series disclosed in United States Patent Number 1,504,741, issued to George C. Chase on August 12, 1924. The numerals, however, appearing on the wheels of one series preferably progress in the opposite direction around the wheels from the direction of progression of the other series, and reversing gearing 392, controlled by a shift lever 399 is preferably provided, whereby the direction of rotation of the wheels of both sets may be reversed.

Alternatively, of course, one or both sets of revolution counters may be of the "nineteen point" type, wherein no carry mechanism is employed and each wheel is marked with two reversely progressive series of figures.

Patent Number 1, 462,061, issued to E. F. Britten, Jr., on July 17, 1923, shows a positive overthrow check device, operating in connection with the tens carry. In the machine herein disclosed, similar check pawls 7 are provided in association with the intermediate gears at the left-hand end of the series, and the adjustable supporting arms of the left-hand carry teeth 152 are provided each with cam portions 8, so spaced with relation to its tooth as to contact with and force pawl 7 between the teeth of the intermediate gear immediately after the transmission of the carry impulse.

I claim:

1. In a motor driven calculating machine having numeral wheels; actuators for said wheels having a reversible cycle of operation and including progressively offset carry members operable successively in either direction up to and beyond a median starting and stopping position of the actuators, and motor operation control means comprising devices including a clutch adapted to transmit a driving impulse to said actuators, and devices adapted to unclutch and check the actuators beyond and to return the same through either of their two final registering positions to said median position.

2. In a motor driven calculating machine having numeral wheels, actuators for said wheels having a reversible cycle of operation and including progressively offset carry members operable successively in either direction up to and beyond a median starting and stopping position of the actuators, and motor operation control means comprising clutch devices and stopping devices, including a control member operable after the actuators pass through their median position, and means to release the clutch, to check the actuators beyond either of their two final registering positions, and to bring the same to rest in such median position.

3. In a motor driven calculating machine having numeral wheels; actuators for said wheels having a reversible cycle of operation and including progressively offset carry members operable successively in either direction up to and beyond a median starting and stopping position of the actuators, and motor operation control means comprising clutch devices and stopping devices, including a control member operable after the actuators pass through their median position, a member engageable by said first-named member substantially as the actuators pass either of their two final registering positions, and mechanism cooperating with the members when so engaged to release the clutch, to check the actuators and to bring the same to rest in such median position.

4. In a motor driven calculating machine having a transversely shiftable carriage and numeral wheels thereon; actuators for said wheels having a cycle of operation extending up to and beyond a median starting and stopping position of the actuators; and devices adapted to lock said carriage against shifting during movement of the actuators up to and beyond said median position, and to release the carriage as the actuators are brought to rest.

5. In a motor driven calculating machine having a transversely shiftable carriage and numeral wheels thereon; actuators for said wheels having a reversible cycle of operation extending up to and beyond a median starting and stopping position of the actuators, and devices adapted to lock said carriage against shifting during movement of the actuators up to and beyond said median position in either direction of movement, and to release the carriage as the actuators are brought to rest.

6. In a motor driven calculating machine having a transversely shiftable carriage and numeral wheels thereon; actuators for said wheels having a cycle of operation extending up to and beyond a median starting and stopping position of the actuators, and devices adapted to lock said carriage against shifting during movement of the actuators up to and beyond said median position, including a driven disk having an unlocking notch, and a driving member having a lost motion connection with said disk, the angular extent of the notch being less than the angular extent of the lost motion of the driving member.

Signed at Orange, in the county of Essex and State of New Jersey, this 26th day of May, A. D. 1930.

GEORGE C. CHASE.